United States Patent
Lakso

Patent Number: 5,740,847
Date of Patent: Apr. 21, 1998

[54] PORTABLE POWER TOOL CUTTING GUIDE

[75] Inventor: Eric E. Lakso, P.O. Box 1048 14 Commonwealth Sq., Oak Bluffs, Mass. 02557-1048

[73] Assignee: Eric E. Lakso, Oak Bluffs, Mass.

[21] Appl. No.: 717,761

[22] Filed: Sep. 23, 1996

[51] Int. Cl.$^6$ .................. B27C 5/00; B23Q 3/00
[52] U.S. Cl. .................. 144/144.52; 83/745; 144/144.1; 144/154.5; 144/371; 144/372; 409/125
[58] Field of Search .................. 144/136.95, 144.52, 144/144.1, 154.5, 144.51, 871, 372; 83/565, 821, 745; 409/125, 130, 182

[56] References Cited

U.S. PATENT DOCUMENTS

| | | |
|---|---|---|
| 4,059,038 | 11/1977 | Rietema . |
| 4,075,920 | 2/1978 | Neal . |
| 4,202,231 | 5/1980 | Larson .................. 83/745 |
| 4,202,233 | 5/1980 | Larson . |
| 4,463,644 | 8/1984 | Ferdinand .................. 83/745 |
| 4,524,662 | 6/1985 | Carley .................. 83/745 |
| 4,860,809 | 8/1989 | Cohon et al. .................. 144/154.5 |
| 5,215,134 | 6/1993 | Gudeman .................. 409/125 |
| 5,301,726 | 4/1994 | Wojcik . |

*Primary Examiner*—W. Donald Bray

[57] ABSTRACT

A portable power tool cutting guide comprised of a single guidepiece of extruded material molded to form a dual-sided fence with a remaining flat but ribbed upper surface surrounding the fence and a smooth lower surface, where a reference edge indexed to the particular power tool is cut by aligning the power tool with the fence and cutting the guidepiece parallel to said edge, and the reference edge is then aligned with the desired straight cutting line of a workpiece by means of attachment to the workpiece itself in order to make a straight cut.

3 Claims, 2 Drawing Sheets

# PORTABLE POWER TOOL CUTTING GUIDE

BACKGROUND

Field of the Invention

The present invention related generally to woodworking equipment and more specifically to portable power tool cutting guides which aid the operator in making straight or angled cuts in wood or other similar materials.

BACKGROUND

Description of the Prior Art

The use of portable power tools and escalated greatly since their development to the present day due to their portability and relative ease of use. However, as they are not anchored to a base, portable power tools, in particular, rarely can make accurate, straight cuts as desired. In attempts to alleviate this problem, several portable power tool guides have been produced to stabilize the tool during its cutting operation. Although there are many such guides known and available, none combine the qualities of extreme ease of use, accuracy and inexpensiveness.

The prior art includes portable power tool guides such as U.S. Pat No. 4,075,920 to Neal which describes one such device composed of two metal plates which are placed on opposite sides of a workpiece and bolted into place. Though the device does permit its specific adaptation to a particular portable power tool, it suffers from the drawback of being cumbersome to operate as bolts and their apertures must be aligned and attached through or around the perimeter of each novel workpiece. A further disadvantage is the damage which may well occur to each workpiece thus used.

A variation on the theme of Neal is found in U.S. Pat. No. 4,059,038 to Rietema which also describes a device which may be specifically adapted to a particular portable power tool. The Rietema device attaches permanently to a created guidepiece and has upon it pre cut grooves within which a guideplate attached to the portable power tool is pushed during the cutting operation. While Rietema possesses many positive traits it does suffer from the drawbacks of requiring the attachment of a guideplate to the portable power tool to be used and its disattachment and reattachment if tools are changes as its pre cut grooves will only accommodate one size and type of guideplate. Also, as this device is not placed directly upon the workpiece but instead is attached to a guidepiece, the cutting edge of the power tool must be lowered to cut the workpiece below. In addition to the potential additional danger, it is conceivable that some thicker workpieces may not be able to be cut fully through.

More complex attempts at stabilizing portable power tools are demonstrated in patents such as U.S. Pat No. 5,301,726 to Wojcik which illustrates an elaborate spring loaded, track supported guide. Though the device in Wojcik accomplishes its purpose of stabilizing a portable power tool, it does so with the twin drawbacks of expense and complexity of use.

Yet further structures used to stabilize portable power tools include U.S. Pat No. 4,202,333 to Larson which shows a device to allow a power hand saw, router, sabre saw or other power hand tool to be guided into the making of straight or angled cuts and Ferdinand, et al (U.S. Pat. No. 4,463,644 ) which illustrates a device joining two rails together with a "joiner plate" to create a straight edge. Carley (U.S. Pat. No. 4,524,662 ) shows a simple straight edge device for use to guide power tools, while U.S. Pat. No. 4,860,809 to Cohon, et al. and U.S. Pat. No. 5,215,134 to Gudeman demonstrate methods to create mating alternate contour surfaces and matched edge surfaces respectively. All of these devices fall to provide reference edge to guide the user as to the point where the power tool will impact the work piece, all require attachment to the work piece in order to properly be used and all are of multi-piece construction rather than single piece.

The present invention substantially departs from the conventional concepts and designs of the prior art, and in doing so provides a device which allows for accurate and straight cuts by a portable power tool, inexpensively, with extreme ease of use.

Therefore, it can be appreciated that there exists a need for a portable power tool cutting guide which provides for accurate and straight cuts by a portable power tool, does so inexpensively and with extreme ease of use. The present invention substantially fulfills this need.

SUMMARY OF THE INVENTION

In the view of the foregoing disadvantages inherent in the known types of portable power tool cutting guides now present in the prior art, the present invention demonstrates a portable power tool cutting guide which provides for accurate and straight cuts by a portable power tool, does so inexpensively and with extreme ease of use. As such, the general purpose of the present invention is to provide a novel device having all the advantages of prior art portable power tool cutting guides within the same individual device.

To attain this, the present invention essentially comprises a single piece of extruded plastic or other similar material, molded to form a dual-sided fence and remaining rectangular flat but ribbed surface surrounding this fence. The ribs upon the upper face of the rectangular surface are parallel to the fence and interspaced an equal distance from one another. The underside of the rectangular surface is smooth in appearance. The device may be indexed to any particular portable power tool prior to its initial use in cutting workpieces. This indexing is accomplished by placing the base plate of the portable power tool against one of the outer, perpendicular walls of the fence at one end of the device. The tool is then pushed across the device while maintaining contact with the same outer wall of the fence until the other end of the device is reached. The device can then be clamped upon a workpiece with its newly cut edge placed along the desired cutting line. These clamps are placed on the side of the device opposite the newly cut edge. The tool is then placed against the same outer wall of the fence and pushed across the device in the manner described immediately above. This results in an accurate and straight cut along the desired cutting line as the newly cut edge is the precise indicator of where the cutting edge of the power tool will cut. Once indexed, the device can be used with the same portable power tool repeatedly with equal accuracy.

There has thus been outlined the more important features of the invention in order that the detailed description thereof which follows may be better comprehended and in order that the present contribution to the art may be better appreciated.

It is to be understood that the invention is not limited in its application to the details of construction set forth in the following preferred embodiment and drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a portable power tool cutting guide which will permit the cutting of accurate and straight lines by the portable power saw.

It is another object of the present invention to provide a portable power tool cutting guide which will be extremely easy to use.

It is yet another object of the present invention to provide a portable power tool cutting guide which is of durable and reliable construction.

It is still yet another purpose of the present invention to provide a portable power tool cutting guide susceptible to a low cost of manufacture with regard to both materials and labor, and which accordingly is then susceptible of low prices of sale to the consuming public, therefore making the present invention economically available to the public.

These together with other objects of the invention, along with various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiment of the invention.

BRIEF DESCRIPTION OF THE DRAWINGS

The invention will be better understood and objects other than those set forth above will become apparent when consideration is given to the following detailed description. This description makes reference to the attached drawings where.

The same reference numerals refer to the same parts through the different figures.

DESCRIPTION OF THE PREFERRED EMBODIMENT

Figure 1:
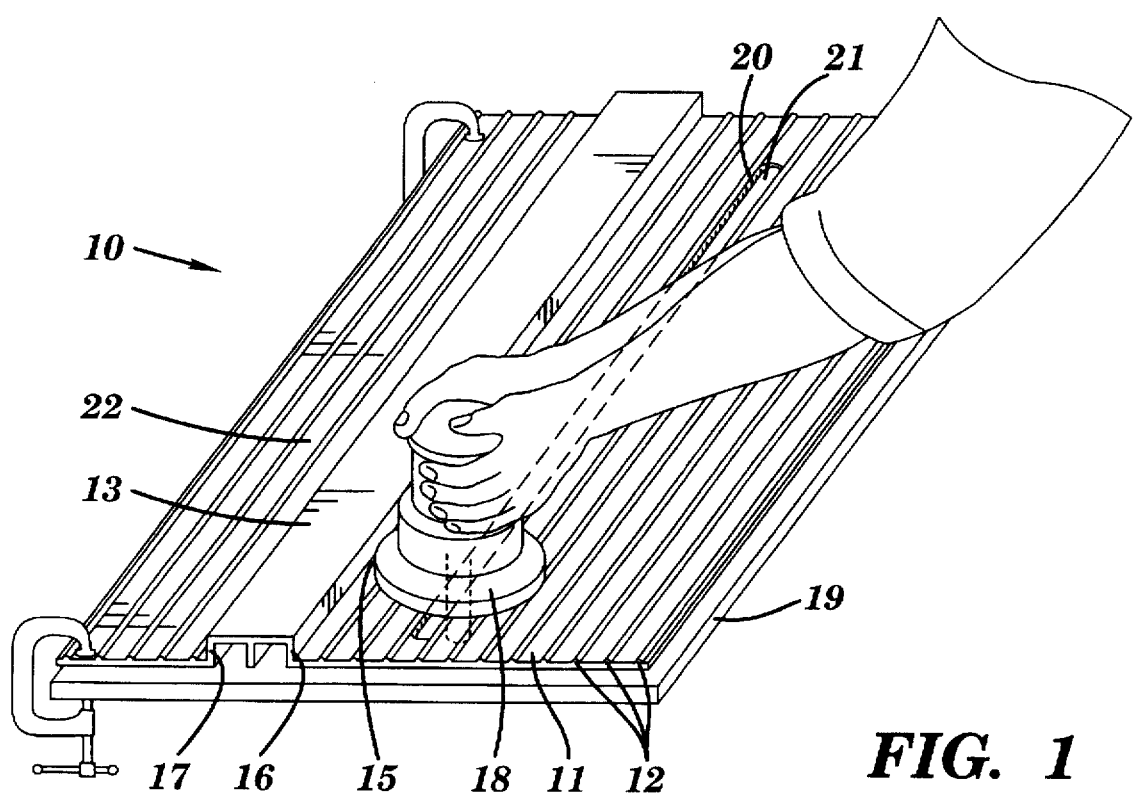
FIG. 1 illustrates the placement of a portable power router in a cutting position on the invention and accompanying workpiece.
Figure 2:
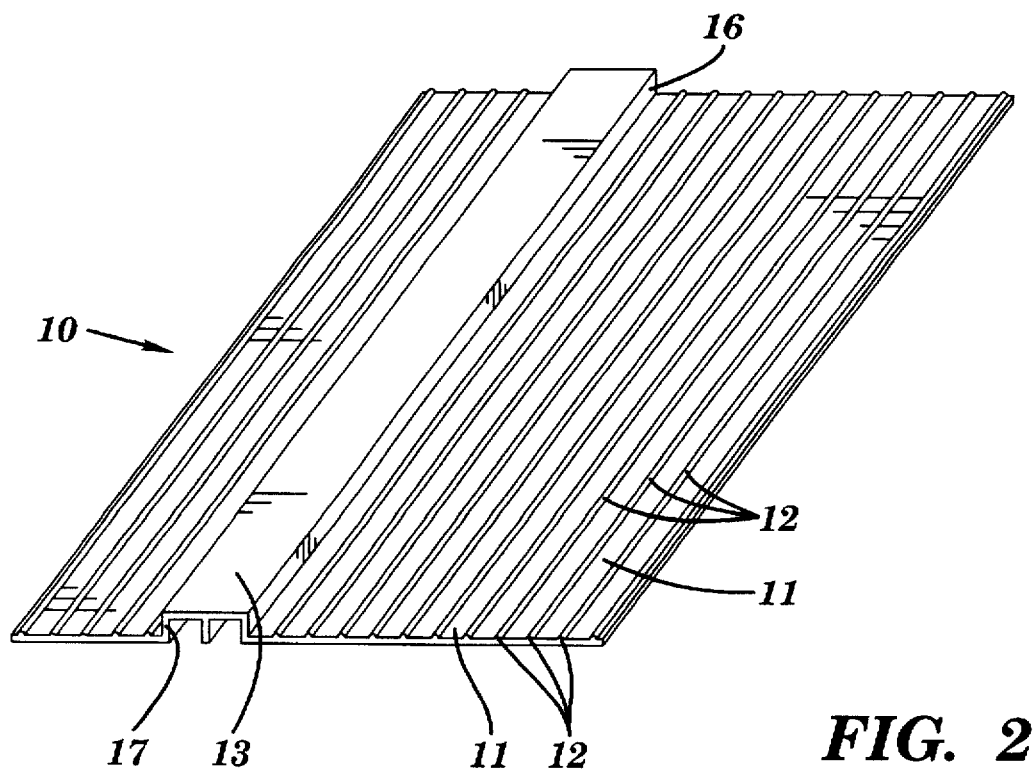
FIG. 2 is a three-dimensional top view of the invention.
Figure 3:
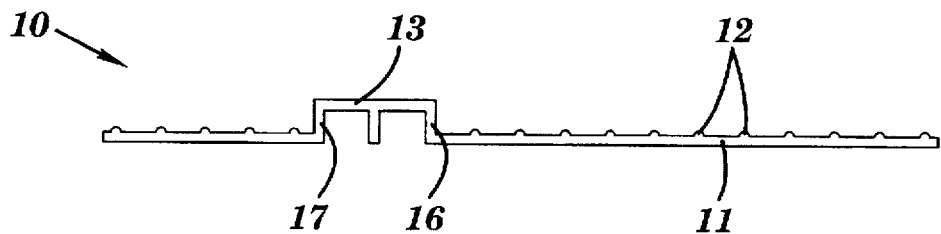
FIG. 3 is a side-view of the invention.
Figure 4:
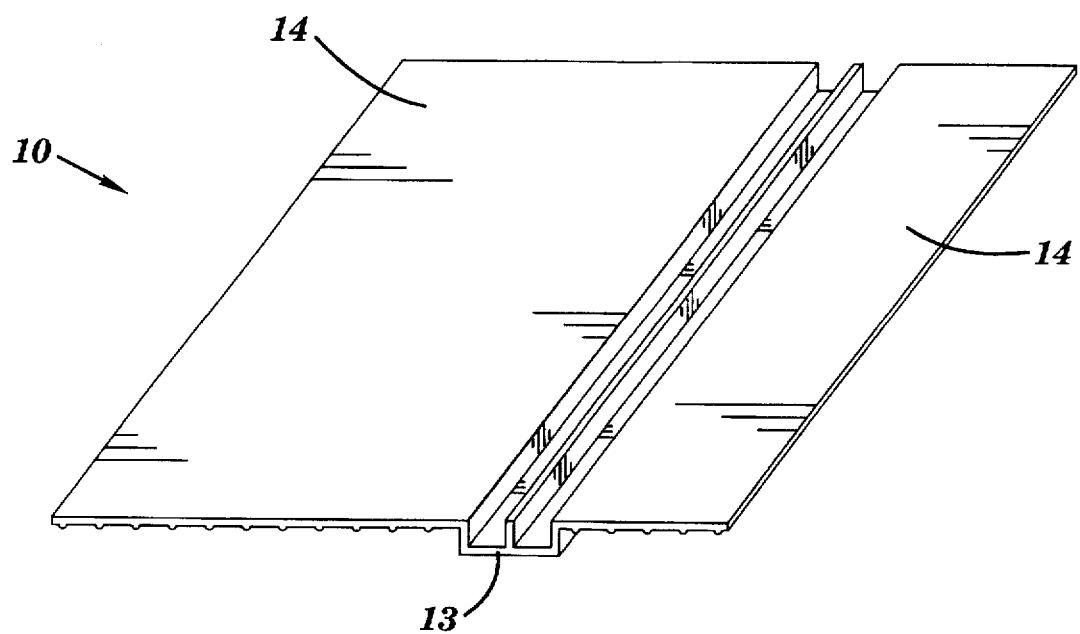
FIG. 4 is a three-dimensional bottom view of the invention.

With reference now to the drawings, the preferred embodiment of the portable power tool cutting guide, which is generally designated by the reference number 10, will be described.

The device 10 is composed of a flat rectangular surface 11 with interspaced, parallel ribs 12 protruding from this surface. Also protruding from this rectangular surface 11 is a two-sided fence 13 which is parallel to the interspaced ribs 12. The underside of the device 14 has a smooth surface.

As to the manner of usage and operation of the present invention, the device is first indexed to a particular portable power tool by placing the outermost edge of the tool base plate 15 against the end of the device against a perpendicular outer wall of the fence 16, 17, and cutting the device by guiding the tool base plate 18 against the chose perpendicular outer fence wall 16 or 17 until the other end of the device is reached. Thus indexed to that particular portable power tool, the device may then be placed upon a workpiece 19 with its underside against the workpiece, and its newly-cut edge 20 aligned with the chosen cut line 21 of the workpiece. The device 10 is then clamped to the workpiece 19 by means of two or more clamps holding together the device 10 and workpiece 19 on the side of the fence opposite the newly-cut edge 22. The same portable power saw base plate 15 is placed against the end of the device against the same perpendicular outer fence wall 16 or 17, and a cut is made in the underlying workpiece 19 by guiding the saw base plate 18 against the chosen perpendicular outer fence wall 16 or 17 until the other end of the device is reached.

With respect to the above description then, it is to be realized that the optimal dimensional relationships for the various portions of the invention, to include variations in size, materials, shape, form, and function and the manner of operations, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power tool cutting guide assembly, comprising:
    (a) an elongated guide plate structure having a rectangular shape and a means associated with said guide plate structure for guiding a power tool along said guide bar plate in a straight path with the cutting edge of said power tool moving along a straight, predetermined cutting path alongside said guide plate structure
    (b) said guide plate structure having a longitudinal dimension for alignment along said straight cutting path, said guide plate structure being made of a material which can be cut by said power tool to demarcate a reference edge
    (c) said guide plate structure having an upwardly protruding portion extending the length of said guide plate structure with said protruding portion parallel with the parallel longer sides of said guide plate structure and against which said power tool is held as a guide while moving it along the straight, predetermined cutting path.

2. The device of claim 1 wherein the guide plate structure is striated along its upper surface and smooth along its lower surface.

3. The device of claim 1 wherein the guide plate structure is held to a work piece by clamping means.

\* \* \* \* \*